United States Patent [19]

Komoda

[11] Patent Number: 4,746,341
[45] Date of Patent: May 24, 1988

[54] POROUS CERAMIC FILTER AND PROCESS OF PRODUCING THE SAME

[75] Inventor: Tadanori Komoda, Toyoake, Japan

[73] Assignee: NGK Insulators, Ltd., Japan

[21] Appl. No.: 852,758

[22] Filed: Apr. 16, 1986

[30] Foreign Application Priority Data

Apr. 17, 1985 [JP] Japan ................................ 60-81972

[51] Int. Cl.$^4$ ............................................. B01D 50/00
[52] U.S. Cl. ...................................... 55/487; 55/523; 55/524; 501/80
[58] Field of Search .................... 501/80; 55/523, 524, 55/487; 427/383.5, 376.2, 420, 244

[56] References Cited

U.S. PATENT DOCUMENTS 4,356,215 10/1982 Auriol et al. ......................... 427/244
4,629,483 12/1980 Stanton ................................ 55/487

FOREIGN PATENT DOCUMENTS 58-205504 11/1983 Japan ..................................... 55/524

Primary Examiner—Mark L. Bell
Assistant Examiner—A. Knab

Attorney, Agent, or Firm—Parkhurst & Oliff

[57] ABSTRACT

A porous ceramic filter consisting of a planar porous support formed of a ceramic material, and a filtering layer formed of a fired mass of a ceramic powder integrally deposited on an upper surface of the porous ceramic support. A particle size of the ceramic powder, and a size of macro pores formed in the fired mass of said ceramic powder, decrease substantially continuously in a direction from the upper surface of the ceramic support toward an exposed surface of the filtering layer. The porous ceramic filter is produced by a process including preparing a suspension containing a ceramic powder of a predetermined particle size distribution; holding the porous support stationary such that the upper surface extends substantially horizontally, and is in contact with the suspension, until particles of the ceramic powder are sedimented by gravity and thereby deposited on the upper surface of the porous support, as an unfired layer for the filtering layer; removing aqueous components from said porous ceramic support and the unfired layer of the deposited particles; and firing the porous ceramic support and the unfired layer to produce the porous ceramic layer.

6 Claims, 1 Drawing Sheet

POROUS CERAMIC FILTER AND PROCESS OF PRODUCING THE SAME

BACKGROUND OF THE INVENTION

1. Field of the Art

The present invention relates to a porous ceramic filter or filter medium, and a process of producing the same, and more particularly to such a ceramic filter of a planar shape having a filtering layer with a uniform thickness and with a porous structure which is protected against clogging, and a process by which such a planar ceramic filter is produced.

2. Related Art Statement

There is known a multiple-layer ceramic filter medium (hereinafter simply called "ceramic filter") which consists of a porous support body of a tubular shape formed of a ceramic material and having a high mechanical strength, and at least one filtering layer formed of a material similar to that of the porous support body and having minute or macro pores. The filtering layer or layers is/are formed integrally on an inner or outer surface of the porous support body. This type of ceramic filter has a relatively low resistance to a flow of a liquid to be filtered, and is very effective in separating fine solid particles from a large amount of flow of the liquid. The ceramic filter is produced, for example, by a process which comprises the steps of: preparing a suspension which contains particles of a suitable material of which a filtering layer is formed; holding one surface of a porous support in contact with the prepared suspension, thereby forming a thin unfired layer of the particles deposited on the surface of the porous support body; and firing the unfired layer into the filtering layer. Another process is disclosed in Japanese Patent No. 1066935 (Japanese Patent Publication No. 56-8643 in 1981). This process includes the steps of: preparing a slurry for forming the filtering layer; introducing the slurry into the tubular porous support body; rotating the support body so that the slurry is spread over the inner surface of the support body, by a centrifugal force, so that a layer of the slurry adheres to the inner surface of the support body; and firing the porous support body with the layer of the slurry on its inner surface. An alternative process is known according to U.S. Pat. No. 4,356,215. This process includes the steps of: preparing two masses of coating suspension, i.e., a first slip coating liquid and a second slip coating liquid, which contain mineral particles having different sizes, respectively; applying the first slip coating liquid to a surface of the porous support body, to form a first deposited layer, heating and drying the first deposited layer, and subsequently firing the porous support body with the first deposited layer; and applying the second slip coating liquid to the fired first deposited layer to form a second deposited layer, heating and drying the second deposited layer, and finally firing the porous support with the first and second deposited layers.

3. Problems Solved by the Invention

However, the above-indicated processes are not satisfactory for producing a ceramic filter having a planar configuration. More specifically, the second process using a centrifugal force to form the filtering layer requires comparatively complicated and large-sized equipment, and is limited in application to the production of ceramic filters having substantially tubular shapes. The first or third process suffers difficulty in obtaining uniform or even thickness of the filtering layer, and is disadvantageous in that the filtering layer is easily clogged.

SUMMARY OF THE INVENTION

It is therefore an object of the present invention to provide a planar porous ceramic filter having a filtering layer with a uniform thickness, which suffers minimum clogging during service.

Another object of the invention is to provide a process by which a planar porous ceramic filter as indicated above may be produced with a simple procedure, by means of comparatively simple equipment.

The present invention was developed as a result of extensive studies of the inventor on the filtering mechanism of a planar porous ceramic filter. The studies revealed the fact that a filtering layer formed of ceramic particles deposited on a surface of a planar porous ceramic support is least subject to clogging, when a size of the ceramic particles of the filtering layer, and a size of macro pores formed in the filtering layer (a mass of the ceramic particles) decrease substantially continuously in a direction from the surface of the ceramic support toward an exposed surface of the filtering layer, so that the particle size is maximum adjacent to the above-indicated surface of the ceramic support, and minimum adjacent to the exposed surface of the filtering layer.

In accordance with the present invention developed based on the above fact, there is provided a porous ceramic filter consisting of a planar porous support formed of a ceramic material, and a filtering layer formed of a fired mass of a ceramic powder integrally deposited on a surface of the porous ceramic support, characterized in that a size of macro pores formed in the fired mass of the ceramic powder, decreases substantially continuously in a direction from the above-indicated surface of the porous support toward an exposed surface of the filtering layer remote from the surface of the porous support.

According to one feature of the invention, the size of the macro pores in the filtering layer falls within a range of 1–5 microns adjacent to the surface of the porous ceramic support, while the size of the macro pores in the fired mass of the ceramic powder falls within a range of 0.1–0.5 micron adjacent to the exposed surface of the filtering layer.

The porous ceramic support and the filtering layer may be formed of a powder of a ceramic material such as silica, mullite, zirconia, silicon carbide and alumina. For increased resistance to corrosion of the ceramic filter, it is advantageous to use a powder of alumina. It is further advantageous that the porous support and the filtering layer are formed of the same ceramic powder, from the standpoint of coherence of the filtering layer to the porous support, after the firing of the filtering layer.

According to another aspect of the invention, there is provided a process of producing a porous ceramic filter consisting of a planar porous support formed of a ceramic material, and a filtering layer formed on an upper surface of said porous ceramic support, comprising the steps of: (a) preparing a suspension containing a ceramic powder of a predetermined particle size distribution; (b) holding the planar porous support such that the upper surface extends substantially horizontally, and holding the upper surface of the porous support in contact with the suspension maintained in a stationary state, until particles of the ceramic powder are sedimented by gravity and thereby deposited on the upper surface of the porous support, whereby an unfired layer for the filtering layer is formed of the deposited particles of the ceramic powder on the upper surface of the porous ceramic support; (c) removing aqueous components from the porous ceramic support and the unfired layer of the deposited particles; and (d) firing the porous ceramic support and the unfired layer, into the porous ceramic layer.

The suspension used in the present process is preferably water or alcohol containing the ceramic powder in an approximate amount of 1-10% by weight. The suspension has poor dispsersion of the ceramic powder if the concentration of the powder exceeds the upper limit (10%) of the above range. If the concentration is lower than the lower limit (1%), a comparatively large amount of the suspension is required to obtain a given thickness of the filtering layer.

According to an advantageous feature of the method of the present invention, at least 80% by weight of the ceramic powder contained in the suspension consists of particles of 0.5-10 microns. If the size of the ceramic powder particles is smaller than the lower limit (0.5 micron), the time for natural sedimentation of the particles is excessively long, and the size of the macro pores adjacent to the exposed surface of the filtering layer may not be held within the previously indicated range of 0.1-0.5 micron. If the particle size exceeds the upper limit (10 micron), the layer of the ceramic powder deposited on the porous ceramic support is difficult to fire, and the size of the macro pores adjacent to the surface of the porous ceramic support may not be held within the previously indicated range of 1-5 microns.

According to another advantageous feature of the method of the invention, the porous ceramic support is immersed in a liquid, before the upper surface of the ceramic support is brought into contact with the suspension, so that pores in the ceramic support are filled with masses of the liquid, in order to remove a gas from the pores. Preferably, the thus treated porous ceramic support with the pores filled with the liquid is immersed in the suspension. In this case, the liquid filling the pores functions to eliminate pin holes which would otherwise be formed in the filtering layer due to the presence of the gas in the pores. For complete removal of the gas from the pores, it is preferred to hold the liquid at an elevated temperature (preferably at the boiling point), and/or under a reduced pressure.

In the porous ceramic filter produced according to the present invention, the particle size of the ceramic powder of the filtering layer, and the size of the macro pores formed therein decrease substantially continuously in the direction from the bottom toward the exposed surface of the filter layer, as previously indicated. In this arrangement, most of solid particles contained in a liquid to be filter are caught and accumulated as a cake adjacent to the exposed surface of the filtering layer at which the pore size or diameter is the smallest. The solid particles which pass through a porous structure adjacent to the surface of the filtering layer, may be moved through the comparatively large macro pores in the inner porous structure of the filtering layer, and through the pores in the porous support, and finally leave the ceramic filter. Therefore, substantially no solid particles separated from the liquid to be filtered will stay within the inner porous structure of the filtering layer. Namely, the inner porous structure will not be clogged or plugged with the solid particles. After a suitable period of service, the filter cake deposited on the surface of the filtering layer is removed easily by washing the filter with a washing liquid flowing in the direction opposite to the filtering direction. Thus, the ceramic filter may be restored to its fully operable condition.

According to the process of the present invention, the ceramic particles of various sizes suspended in the suspension held stationary in contact with the upper surface of the porous support, settle at different sedimentation speeds, and are consequently deposited on the upper surface of the porous support, in the order of the particle size, such that the particles of comparatively small sizes are deposited on a layer of the particles of comparatively large sizes. Thus, the particle size of the unfired filtering layer obtained decreases substantially continuously in the direction from the bottom toward the exposed surface of the layer, from the maximum size at the bottom to the minimum size on the exposed surface. Accordingly, the size of the pores formed by the ceramic particles of the unfired filtering layer decreases substantially continuously in the same direction. By firing the thus formed unfired filtering layer after removal of the aqueous components, the instant porous ceramic filter is produced. In the process of the invention, the formation of the unfired filtering layer proceeds only by means of natural sedimentation of the ceramic particles. As a result, the filtering layer is given uniform surface smoothness and thickness. For promoting the deposition of the ceramic powder particles and removing aqueous components from the deposited layer, a reduced pressure may be applied to the surface of the porous ceramic support opposite to the surface on which the ceramic powder particles are deposited as the unfired filtering layer. However, the level of the reduced pressure should be determined so as not to disturb the natural sedimentation of the ceramic particles. The instant process permits easy adjustment of the filtering layer in its thickness and pore size, by selecting the particle size of the ceramic powder, viscosity of the suspension, time of holding the porous support in contact with the suspension, and other parameters.

BRIEF DESCRIPTION OF THE DRAWINGS

The foregoing and other objects, features and advantages of the present invention will be better understood by reading the following detailed description of the invention, when considered in connection with the accompanying drawings, in which.

DETAILED DESCRIPTION OF THE INVENTION

Figure 1:
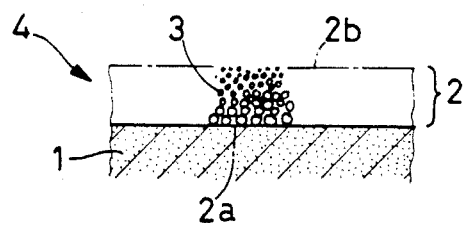
FIG. 1 is an enlarged fragmentary view in cross section of a planar porous ceramic filter of the present invention.
Figure 2:
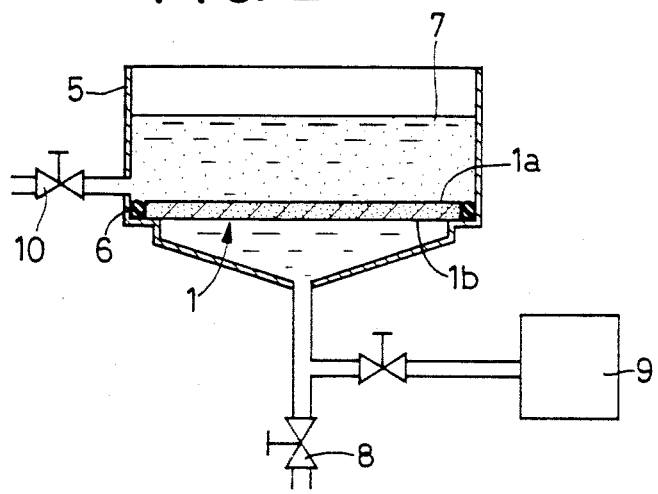
FIG. 2 is an elevational view in cross section of one example of a device used to practice one embodiment of a process of the invention.

Referring to FIGS. 1 and 2 of the accompanying drawings, there is shown a disc-shaped porous support 1 made of a ceramic material. This porous support 1 is processed as described below, before it is set in a stationary tank 5 of a device illustrated in FIG. 2. Initially, the porous support 1 is immersed in a pool of boiling water, so that the pores in the porous support 1 are filled with the water. Thus, the gas which has existed in the pores is removed. Subsequently, the porous support 1 is cooled in air. The thus processed porous support 1 is installed horizontally in the bottom portion of the stationary tank 5, as indicated in FIG. 2, such that the porous support 1 is submerged in a volume of water previously introduced in the tank 5 so that the surface of the water is about 1 to 2 cm above the upper surface of the submerged porous support 1. Reference numeral 6 designates an O-ring interposed to secure a sealing between the periphery of the porous support 1 and the opposite inner surface of the tank 5. In the meantime, a suspension 7 containing a ceramic powder of a predetermined particle size distribution is prepared. With the porous support 1 installed in position in the stationary tank 5 as described above, the tank 5 is filled with the prepared suspension 7. The suspension 7 is held stationary in the tank 5 for a suitable period from about 5 minutes to about 60 minutes. During this holding time, the ceramic particles of different sizes settle at different natural sedimentation speeds, and are consequently deposited on an upper surface 1a of the porous support 1, in the order of their size, such that the ceramic particles of comparatively large sizes are deposited before the ceramic particles of comparatively small sizes. In this way, an unfired layer of the ceramic particles is formed on the upper surface 1a of the porous support 1. Subsequently, the tank 5 is drained by opening a drain valve 8 provided in a drain line communicating with the bottom of the stationary tank 5. After the drain valve 8 is restored to its closed position, a vacuum pump 9 also communicating with the bottom of the tank 5 is activated to hold the porous support 1 under a predetermined reduced pressure. Namely, a lower surface 1b of the porous support 1 is exposed to the reduced pressure, whereby the aqueous components left in the porous support 1 and in the deposited layer of the ceramic particles are removed. The porous support 1 with the deposited layer is then taken out from the tank 5, and dried in air. The dried porous support 1 is fired at a temperature suitable for sintering the ceramic particles of the deposited layer. Thus, a planar porous ceramic filter 4 having an integrally formed filtering layer 2 is produced.

EXAMPLES

The disc-shaped porous support 1 was formed of a ceramic powder whose major component consists of an alumina powder mass of average particle size of 60 microns. The fired porous support 1 had a diameter of 150 mm, a thickness of 3 mm, and a maximum pore size of 15 microns. Then, the porous support 1 was immersed in boiling water and left therein for three hours to remove the gas from the porous structure of the porous support 1. The porous support 1 was then installed in the stationary tank 5 such that the upper surface 1a of the porous support 1 is 2 cm below the surface of the water in the tank 5. In the meantime, a suspension for the filtering layer 2 was prepared as a 95%-water slurry which contains a ceramic powder mass mixed with a small amount of sodium alminate as a defloccu-lant or peptizer. A major component of the ceramic powder mass used consists of an alumina powder of average particle size of one micron. This alumina powder was prepared in a pot mill so that 80% by weight of the alumina powder consists of particles of 0.5–10 microns. The prepared suspension in an amount of 50 cc was introduced into the tank 5, stirred and then held stationary for ten minutes. After the tank 5 was drained, the porous support 1 was exposed to a reduced pressure of 720–730 mmHg for two minutes, to remove the aqueous components from the porous support 1 and the deposited layer of the ceramic particles. The particulars of the filtering layer 2 of the thus obtained porous ceramic filter 4 are given in Table 1.

Table 1 also indicates the particulars of the filtering layer of a planar porous ceramic filter prepared according to a known process which includes the steps of: preparing a 60%-water suspension containing the same ceramic powder as used in the process of the present invention; immersing in the prepared suspension the same porous support as used in the present invention, holding its one surface in contact with the prepared suspension, to form a deposited unfired layer for the filtering layer; drying and firing the unfired layer into the filtering layer.

TABLE 1

| PARTICULARS OF FILTERING LAYER | | CERAMIC FILTER OF THE INVENTION | CONVENTIONAL CERAMIC FILTER |
|---|---|---|---|
| Thickness | | 50 microns | 50 microns |
| Max. Pore Size | | 0.5 microns | 12–14 microns |
| Filtering Rate | | 0.8 m$^3$/m$^2$ hr | 0.5 m$^3$/m$^2$ hr |
| Surface Condition as observed by visual inspection | | Smooth surface without pin holes | Rough surface with many pin holes |
| Average Particle Size | Upper part | 0.6 micron | 1 micron |
| | Middle part | 1.5 micron | 1 micron |
| | Bottom part | 8 microns | 1 micron |

To measure the maximum pore size of the filtering layer indicated in Table 1, the produced ceramic filters were immersed in water. The pore size was obtained from a surface tension of water in the pores in the filtering layer, in relation to an air pressure applied to remove the water from the pores. To measure the thickness and particle size of the filtering layer, the ceramic filters were cut transversely. The thickness and the particle size were measured at the cut surfaces with a stereoscopic microscope. The filtering rate was obtained at a filtering pressure of 0.1 Kg/cm$^2$ (a pressure differential on opposite sides of the ceramic filter).

Filtering tests were conducted on the ceramic filter of the present invention and the conventional ceramic filter. The test results are indicated in Table 2. A slurry or sample liquid used in the tests was prepared by adding a fused alumina powder (#8000 abrasive available from Fujimi-Kenmazai Kogyo Kabushiki Kaisha in Japan, having particles sizes of 0.5–1.5 micron) to water, so that the concentration was 1000 ppm. The prepared slurry was filtered by the ceramic filters for two hours, at a filtering pressure of 1 Kg/cm$^2$. After the filtering operations, the ceramic filters were washed for removal of the filter cakes, with a washing liquid flow in the direction opposite to the filtering direction. Recovery ratios were calculated by comparing the filtering rates of the washed ceramic filters with the filtering rates prior to the filtering tests (nominal filtering rates).

TABLE 2

| | NUMBER OF FILTERING TESTS | CERAMIC FILTER OF THE INVENTION | CONVENTIONAL CERAMIC FILTER |
|---|---|---|---|
| Recovery Ratio | 1st test | 100% | 97% |
| | 2nd test | 99% | 90% |

TABLE 2-continued

| | NUMBER OF FILTERING TESTS | CERAMIC FILTER OF THE INVENTION | CONVENTIONAL CERAMIC FILTER |
|---|---|---|---|
| after washing | 3rd test | 98% | 78% |
| | 4th test | 97% | 62% |

As is apparent from Table 2, the recovery rate of the ceramic filter of the invention is lowered at a very low rate as the number of the filtering tests (filtering operations) increases, as compared with that of the conventional ceramic filter. The filtering layer of the conventional ceramic filter after the washing operation is increasingly clogged with the filter cake formed of the fine abrasive particles contained in the slurry, as the filtering operation is repeated. In other words, the fine abrasive particles tend to remain in the porous structure of the filtering layer in which the pore diameter is uniform throughout the thickness of the layer. On the contrary, the clogging rate is considerably low in the ceramic filter of the present invention wherein the pore size of the filtering layer increases in the direction from the exposed surface toward the porous support. This pore size distribution in the direction of thickness of the filtering layer is very much effective to prevent the clogging of the filtering layer with solid particles (such as the abrasive particles used in the tests) separated from a slurry to be filtered.

Figure 3:
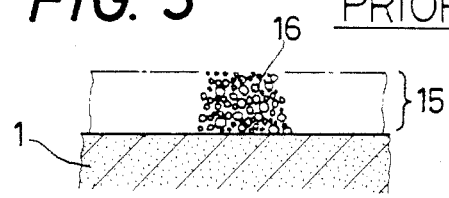
FIG. 3 is a view corresponding to FIG. 1, showing an example of a planar porous ceramic filter produced according to a known process.

Contrary to the planar porous ceramic filter produced according to the present invention, a planar porous ceramic filter produced in the conventional process wherein one surface of a porous support is placed in contact with a suspension, is given a filtering layer 15 which is formed of ceramic particles 16 of various sizes, as illustrated in FIG. 3. In this ceramic filter, some of the solid particles contained in a liquid or slurry to be filtered tend to be caught in an inner porous structure of the filtering layer 15. In this condition, the ceramic filter may not be restored to its fully operable condition, by the reverse washing procedure as indicated above. In other words, the ceramic filter remain partially clogged. A ceramic filter support produced in a process as disclosed in U.S. Pat. No. 4,356,215 has a second deposited layer with an exposed surface. This second deposited layer has a porous structure similar to that of the above-indicated filtering layer 15, and is therefore easily clogged. If a filtering layer with a porous structure similar to that of the present invention is to be formed according to the process disclosed in the above document, it is necessary to prepare many different slip coating liquids which contain in suspension ceramic powders of different ranges of particle size, respectively. That is, it is required to bring the porous support into contact with the different slip coating liquids, and dry each of the deposited filtering layers formed one after another. This process is extremely cumbersome and is by no means commercially practical.

While the present invention has been described in its preferred embodiments with a certain degree of particularity, it is to be understood that the invention is by no means confined to the precise details of the disclosure contained herein, but may be otherwise embodied. For example, the stationary tank 5 may be drained of the suspension 7 by opening a valve 10 rather than the previously described drain valve 8. The valve 10 is provided in a conduit which communicates with the tank 5 at a level slightly above the upper surface 1a of the ceramic filter 1 installed in position in the tank 5, as indicated in FIG. 2. In the illustrated embodiment, the vacuum pump 9 is used to remove the aqueous components from the porous support with an unfired filtering layer deposited on its upper surface. However, the removal of the aqueous components may be accomplished with a centrifugal force, with a centrifuge), by natural dripping, or by other suitable methods. It will be obvious that the concept of the present invention is applicable to planar porous ceramic filters of various configurations, other than a disc-shaped ceramic filter which has been described for illustrative purpose only.

As described above, the planar porous ceramic filter constructed according to the present invention has a filtering layer which is uniform in thickness and is effectively protected against clogging. The process of the invention may be practiced with a simple procedure, and on a simple device. The ceramic filter obtained according to the invention is suitably used for filtration of bacteria, food stuff, etc., and in bioreactors or other equipment for processing of various liquids.

What is claimed is:

1. A process of producing a porous ceramic filter consisting of a planar porous support formed of a ceramic material, and a filtering layer formed on an upper surface of said porous ceramic support, comprising the steps of:

preparing a suspension containing a ceramic powder of a particle size distribution;

holding said planar porous support such that said upper surface extends substantially horizontally, and holding said upper surface of said porous support in contact with said suspension while maintaining said suspension in a stationary state, so that particles of said ceramic powder are sedimented by gravity and thereby deposited on said upper surface of said porous support, in the order of size of said particles, whereby an unfired layer for said filtering layer is formed of the deposited particles of said ceramic powder on said upper surface of said porous ceramic support, said particle size distribution of said ceramic powder being determined such that the particle size of said unfired layer for said filtering layer decreases substantially continuously in a direction from a bottom toward an exposed surface of said unfired layer, from a maximum at said bottom to a minimum on said exposed surface;

removing aqueous components from said porous ceramic support and said unfired layer of the deposited particles, and firing said porous ceramic support and said unfired layer, into the porous ceramic layer.

2. A process according to claim 1, further comprising the steps of:

immersing said porous ceramic support in a liquid, thereby filling pores in said porous ceramic support with masses of said liquid, so as to remove a gas from said pores, before said upper surface of said porous ceramic support is brought into contact with said suspension.

3. A process according to claim 2, wherein said porous ceramic support is immersed in said liquid while said liquid is boiled.

4. A process according to claim 1, wherein said suspension contains an organic solvent.

5. A process according to claim 1, wherein at least 80% by weight if said ceramic powder consists of particles of 0.5–10 microns.

6. A process according to claim 5, wherein said particle size distribution of said ceramic powder is such that the size of pores formed adjacent to said exposed surface of said unfired layer is within a range of 0.1–0.5 micron, while the size of pores formed adjacent to said bottom of said unfired layer is within a range of 1–5 microns.

* * * * *